United States Patent
Hussain et al.

(10) Patent No.: US 8,353,220 B2
(45) Date of Patent: Jan. 15, 2013

(54) METHOD FOR DETERMINING THE VISCOSITY OF A MEDIUM WITH A CORIOLIS MASS FLOWMETER

(75) Inventors: Yousif Hussain, Weston Favell (GB); Tao Wang, Canterbury (GB)

(73) Assignee: Krohne AG, Basel (CH)

( * ) Notice: Subject to any disclaimer, the term of this patent is extended or adjusted under 35 U.S.C. 154(b) by 165 days.

(21) Appl. No.: 12/912,157

(22) Filed: Oct. 26, 2010

(65) Prior Publication Data

US 2012/0048034 A1 Mar. 1, 2012

(30) Foreign Application Priority Data

Aug. 24, 2010 (DE) .......................... 10 2010 035 341

(51) Int. Cl.
*G01F 1/84* (2006.01)
(52) U.S. Cl. .................................. 73/861.357
(58) Field of Classification Search ......... 73/861.355–861.357
See application file for complete search history.

(56) References Cited

U.S. PATENT DOCUMENTS

| 5,230,254 | A | 7/1993 | Craft |
| 5,602,345 | A | 2/1997 | Wenger et al. |
| 6,006,609 | A | 12/1999 | Drahm et al. |
| 7,357,039 | B2 | 4/2008 | Rieder et al. |
| 8,109,154 | B2 | 2/2012 | Pankratz et al. |
| 2010/0251830 | A1 | 10/2010 | Bitto et al. |

OTHER PUBLICATIONS

U.S. Appl. No. 12/659,534, Bitt et al, Mar. 11, 2010.*

* cited by examiner

*Primary Examiner* — Jewel V Thompson
(74) *Attorney, Agent, or Firm* — Roberts Mlotkowski Safran & Cole, P.C.; David S. Safran

(57) ABSTRACT

A method for determining the viscosity of a medium with a Coriolis mass flowmeter, wherein the Coriolis mass flowmeter has at least two measuring tubes that medium can flow through and a measuring device, wherein the measuring device has at least two actuator assemblies, wherein a measuring tube plane is defined by the measuring tube central axis and wherein the actuator assemblies are arranged on both sides of the measuring tube plane and outside of the measuring tube plane. Elaborate constructional measures for the Coriolis mass flowmeter are avoided by the measuring tubes being excited with a measuring device to at least oppositely directed torsion oscillation (and optionally additionally to plane oscillation) with the actuator assemblies being alternately actuated with opposing effective directions so that at least the viscosity of the medium is determined by evaluation of values from the measuring device.

10 Claims, 5 Drawing Sheets

METHOD FOR DETERMINING THE VISCOSITY OF A MEDIUM WITH A CORIOLIS MASS FLOWMETER

BACKGROUND OF THE INVENTION

1. Field of the Invention

The invention relates to a method for determining the viscosity of a medium with a Coriolis mass flowmeter, wherein the Coriolis mass flowmeter has at least two measuring tubes that medium can flow through and a measuring device, wherein the measuring device has at least two actuator assemblies, wherein a measuring tube plane is defined by the measuring tube central axis and wherein the actuator assemblies are arranged on both sides of the measuring tube plane and outside of the measuring tube plane.

2. Description of Related Art

Coriolis mass flowmeters are known in a plurality of designs in the prior art. Differences include, on the one hand, for example, the number of measuring tubes of an instrument, and on the other hand, whether the measuring tubes are bent or straight. In order to measure the mass flow, the measuring tubes are excited to oscillation; wherein the input and output ends of the measuring tube oscillate in phase to one another without flow. With flow, inertial force from Coriolis acceleration causes a phase shift within the oscillation of the measuring tubes, which is detected by sensor assemblies and can be evaluated as a measuring signal for the mass flow.

Furthermore, Coriolis mass flowmeters are known from the prior art, for example, from U.S. Pat. No. 6,006,609, having just a single measuring tube, wherein the measuring tube can be used, on the one hand, for detecting mass flow in that oscillation is shifted perpendicular to its axial length, the tube also oscillates here in an oscillation plane—for measuring mass flow. On the other hand, the measuring tube can be shifted into torsional oscillation, wherein information about the viscosity of the medium flowing through the measuring tube can be drawn by evaluating this torsional oscillation. The measured physical correlations needed for this have been known for a long time and are not a central object of consideration. At any rate, torsional oscillation causes shear forces acting in the circumferential direction to be created through the measuring tube walls, through which oscillation energy of the torsional oscillation is detracted and dissipated in the medium. In order to sustain the torsional oscillation of the measuring tube, it is necessary that additional excitation energy is supplied to the measuring tube. The viscosity of the medium can be determined from the value of the additionally supplied excitation energy for sustaining the torsional oscillation by means of the measuring sensor.

The Coriolis mass flowmeters known from the prior art and suitable for measuring the viscosity of a medium, however, have one disadvantage, that elaborate measuring devices are required for detecting the torsional oscillation as, for example, in U.S. Pat. No. 6,006,609.

SUMMARY OF THE INVENTION

Based on the prior art described above, a primary object of the present invention is to provide a method for determining viscosity with a Coriolis mass flowmeter, through which elaborate constructional measures on the Coriolis mass flowmeter can be avoided.

The above-mentioned object is met with a method in which the measuring tubes are excited with the measuring device to an oppositely directed torsional oscillation with a frequency $F_1$, the actuator assemblies being alternately actuated with opposing effective directions and at least the viscosity of the medium being determined by evaluation of measured values from the measuring device.

The actuator assemblies are preferably affixed centrally on the measuring tubes in relation to the longitudinal direction of the measuring tubes, wherein each of a first part of an actuator assembly is affixed to one measuring tube and a second part of an actuator assembly is affixed on the other measuring tube. The actuator assemblies are affixed at both sides of the measuring tube plane, so that one actuator assembly is arranged on one side of the measuring tube plane and the other actuator assembly is arranged on the other side of the measuring tube plane. In other words, the actuator assemblies are arranged outside of the measuring tube plane. Preferably, both actuator assemblies are arranged symmetrically to the measuring tube plane.

The measuring tube plane is defined by the measuring tube central axis, this is a plane, in which both measuring tubes are located and this is usually the plane in which the measuring tubes mainly oscillate for determining the mass flow. "Mainly," here, means that oscillation components can always be present, which are located slightly outside of this plane; however, these do not need to be taken into account here.

By activating the actuator assemblies with alternate different effective directions above and below the measuring tube plane, a torsional oscillation can be imprinted on the measuring tubes involved, so that the measuring tubes oscillate rotationally anti-phase to one another. The anti-phase of torsional oscillation of the measuring tube is advantageous in that while the measuring tubes are put into oscillation, the center of gravity of the Coriolis mass flowmeter remains essentially stationary, through which the detected values are less influenced and the quality of the values is increased, without constructional changes on the Coriolis mass flowmeter being necessary.

By activating the actuator assemblies as described, the measuring tubes are either repelled from or pulled toward one another at opposing positions of each measuring tube circumference, so that the torsional oscillation is imprinted very clearly and interfering oscillation is avoided, which undesirably influences the measurement results. The excitation with just one single actuator either above or below the measuring tube plane would lead to the measuring tube also being excited to oscillation components in the measuring tube plane in addition to the rotational oscillation, which would interfere with an evaluation of the pure torsional oscillation.

The torsional oscillation of the measuring tube occurs preferably only between two node plates, which join the measuring tubes to one another at the end sections of the measuring tubes and prevent oscillation from de-coupling to the piping system surrounding the measuring device. In a mass flowmeter having two measuring tubes, the measuring tubes oscillate due to the excitation to torsional oscillation essentially around each measuring tube central axis. In mass flowmeters with, for example, four measuring tubes, every two measuring tubes oscillate together around an axis located between both of the measuring tubes. Application of a mass flowmeter with only two measuring tubes is, however, preferred.

The viscosity is determined by evaluating the measured values from the measuring device, which, on the one hand, can mean that the viscosity is determined using the oscillation values or a damping or, on the other hand, can mean that the viscosity is determined by evaluating the required excitation intensity. For example, the frequency $F_1$ for the torsional oscillation is equal to 720 Hz.

In order to determine the mass flow and the viscosity of the medium at the same time, it is provided by a preferred design of the invention that both measuring tubes are excited at the same time by the measuring device to excitation at torsional oscillation and additionally at plane oscillation in the common measuring tube plane with a frequency $F_2$ differing from frequency $F_1$. "Plane oscillation" means that the oscillation of the measuring tubes occur in a common plane, wherein the measuring tubes preferably oscillate anti-phase to one another even at plane oscillation. At least, then, the mass flow and the viscosity of the medium are determined using the measured values detected by the measuring device. Since torsional oscillation and plane oscillation have different frequencies, these oscillations can be evaluated principally independent of one another so that influence on the measured value of one oscillation by the other oscillation can be ruled out.

The measuring tubes are simultaneously excited by a common excitation signal by the actuator assemblies to torsional oscillation and to plane oscillation at different frequencies. The measuring tubes are pushed apart or pulled together by the actuator assemblies alternately on both sides of the measuring tube plane so that torsional oscillation results with the frequency $F_1$. At the same time, the measuring tubes are excited with the common excitation signal at least by being pushed apart to plane oscillation at frequency $F_2$ in the measuring tube plane. The detection and evaluation for both frequencies and the different measured results occur separately from one another.

According to a design alternative to the afore-mentioned design of the method, it is provided that the measuring tubes are excited at different times by the measuring device to torsional oscillation with a frequency $F_1$ or to plane oscillation with a frequency $F_2$ differing from frequency $F_1$. For this, the measuring tubes are, for example, first excited to torsional oscillation, wherein then the excitation to plane oscillation follows, optionally before or after torsional oscillation has completely died down. Since the excitation to torsional oscillation or to plane oscillation occurs at different frequencies, it is ensured that evaluation of the measured value for determining the mass flow and the viscosity occurs individually and without interference. The viscosity is determined from the measured values of torsional oscillation and the mass flow from the measured values of plane oscillation.

In order to ensure that there is no reciprocal influence of oscillation, frequencies $F_1$ and $F_2$ need to have sufficient spacing relative to one another. Preferably, eigenfrequencies of the measuring tube are chosen for each type of oscillation as frequency $F_1$ and $F_2$, wherein, in particular, such frequencies are chosen that have a minimum frequency distance to one another. According to a preferred further development, it is provided that at least 2% of the frequency of the torsional oscillation, preferably 3.5%, most preferably 5% exists between frequency $F_1$ of the torsional oscillation and the frequency $F_2$ of the plane oscillation. This type of spacing between the frequencies ensures that the measured results are influenced as little as possible from one another and can be separately evaluated without the measured results of the torsional oscillation influencing the measured results of the plane oscillation and vice versa. Preferably, the frequency spacing equals 25 Hz regardless of the frequencies.

Different methods are known for determining the viscosity from the measured results of torsional oscillation, wherein a further development of the method according to the invention is wherein the damping factor of the torsional oscillation of both measuring tubes is determined from the measured values of the measuring device, wherein the viscosity of the medium is calculated using the damping factor. Due to the shear forces caused by the medium, the torsional oscillation is significantly damped so that when the excitation by the actuator assemblies is interrupted, the damping coefficient can be determined. The damping factor is directly related to the viscosity of the medium.

A further possibility for determining the viscosity of the medium is given using a further development of the method, namely in that the amplitude of torsional oscillation reached is evaluated for determining the viscosity of the medium at a set excitation intensity of the measuring device. Since the excitation intensity is dissipated within the medium and the amount of dissipated excitation intensity gives an indication to the viscosity of the medium, the further development of the method provides a further possibility for determining the viscosity, wherein only the calculation method or additional determination of the viscosity using the damping coefficient can be carried out.

As an alternative to determining the amplitude at a set excitation intensity, it is provided by another further development of the method that the excitation intensity required for determining the viscosity of the measuring medium is evaluated at a set amplitude of the torsional oscillation. This method principally evaluates the energy dissipated due to shear stress, through which information about the viscosity of the medium flowing the piping system can be drawn.

For particularly advantageous evaluation of oscillation in the measuring tube, a further design of the method is provided in that the measuring device includes at least four sensor assemblies, wherein two sensor assemblies are arranged each above and below the measuring tube plane and that the torsional oscillation is detected with both sensor assemblies located on one side of the measuring tube plane and the plane oscillation with both sensor assemblies located on the other side of the measuring tube plane. The sensor assemblies belonging together are preferably arranged symmetrically relative to one another. The sensor assemblies are always located outside of the oscillation plane so that torsional oscillation can also be detected with the sensor assembly. Two sensor assemblies are positioned to the left and two sensor assemblies are positioned to the right of the actuator assemblies over the longitudinal length of the measuring tube, so that preferably a symmetrical assembly results over the longitudinal length of the measuring tube.

The actuator assemblies and also the sensor assemblies are advantageously affixed to the measuring tubes with holding devices, wherein it also applies to sensor assemblies that one sensor assembly comprises two parts and each first part of a sensor assembly is affixed to one measuring tube and each second part of a sensor assembly is affixed to the other measuring tube with its own holding device, so that the first part of a sensor assembly and the second part of the sensor assembly can interact with one another.

According to a preferred further development of the method, it is provided that diagnostic information about the maintenance status of the Coriolis mass flowmeter are derived from the values of torsional oscillation. In addition to the diagnostic information from torsional oscillation, the damping coefficient of the plane oscillation can, for example, also be evaluated for diagnostic use. Thus, for example, the measuring tubes are also shifted at regular intervals without a medium flowing to torsional oscillation and/or plane oscillation so that by comparing the current measured values with previous measured values or directly from the measured values, diagnostic information can be obtained regarding the maintenance state of the measuring instrument.

According to a final design of the method, it is provided that, after exciting the measuring tube to torsional oscillation and/or to plane oscillation, the actuator assemblies are used as a sensor assembly for determining measured values. Technically, actuator assemblies and sensor assemblies are not essentially different than one another, since both in actuator assemblies and in sensor assemblies, one side often has a magnet as a first part of an assembly and a coil on the other side of an assembly, so that an actuator assembly can be used as a sensor assembly and a sensor assembly essentially can be used as an actuator assembly. For this, the actuator assemblies are first used as actuator assemblies for creating torsional oscillation and/or plane oscillation. Then, the excitation of the oscillation is stopped and the oscillation is detected with the now oscillating, actuator assembly used as sensor assembly and the measured values are then evaluated. Of course, the use of the actuator assemblies as sensor assemblies can be manually or automatically switched alternately during operation so that the measuring tube is regularly excited but also an occasional detection of measured values occurs.

In detail, there is a plurality of possibilities for designing and further developing the method according to the invention as will be apparent from the following detailed description of preferred embodiments in conjunction with the accompanying drawings.

DETAILED DESCRIPTION OF THE INVENTION

Figure 1:
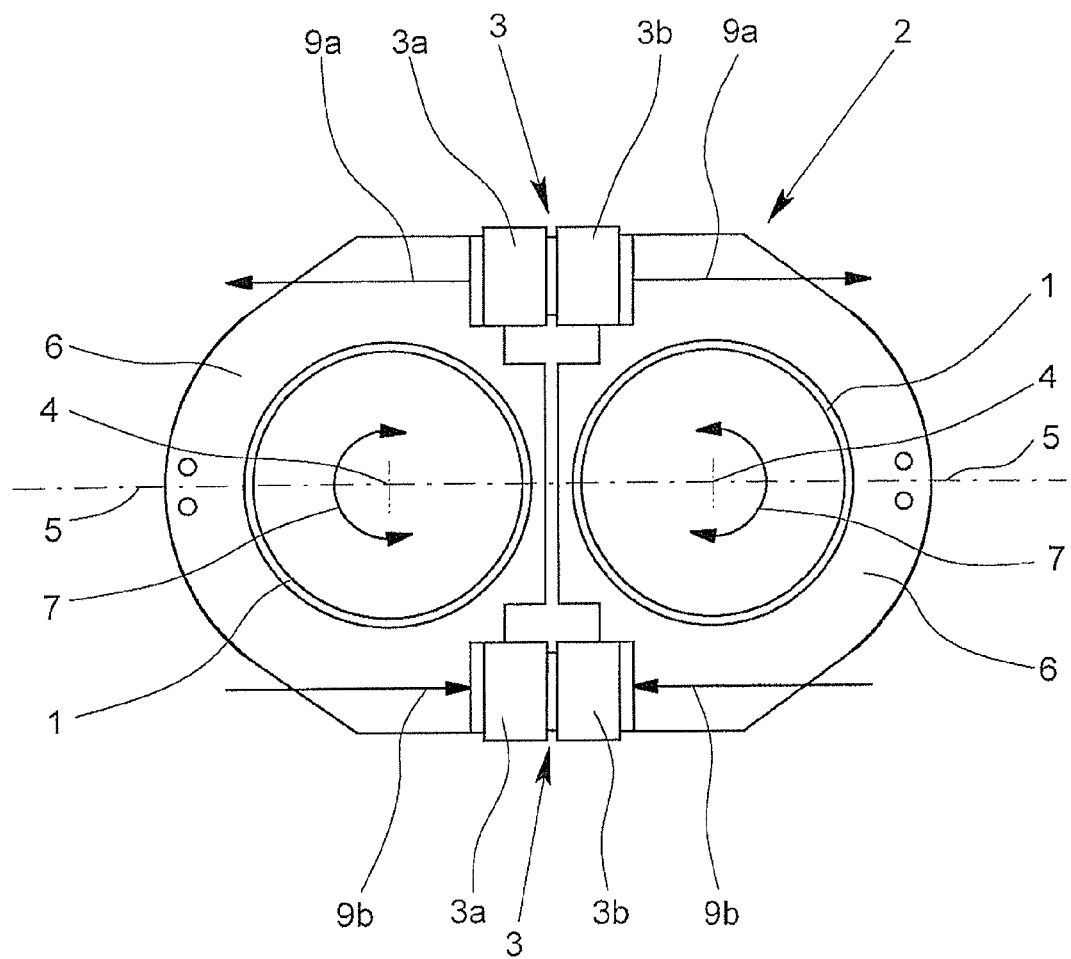
FIG. 1 is a sectional view of two measuring tubes of a Coriolis mass flowmeter, which have been excited to torsional oscillation using the method.

FIG. 1 shows two measuring tubes 1 that can have medium flowing through them for a Coriolis mass flowmeter, with which a method for determining the viscosity of the medium is carried out. A part of a measuring device 2 is affixed to the measuring tubes 1, wherein the measuring device 2 includes at least two actuator assemblies 3. Each actuator assembly 3 includes a first part 3a and a second part 3b. The measuring tube central axes 4 of the measuring tubes 1 define a measuring tube plane 5, in which the measuring tubes 1 mainly oscillate for measuring the mass flow of a medium. The actuator assemblies 3 are affixed with a holding device 6 to the measuring tubes 1 in such a manner that the actuator assemblies 3 are arranged on both sides of the of the measuring tube plane 5, one actuator assembly 3 being located above the measuring tube plane 5 and one actuator assembly 3 being located below the measuring tube plane 5. In the embodiment shown in FIG. 1, the actuator assemblies 3 are arranged symmetrically relative to one another with respect to the measuring tube plane 5.

To carry out the method according to the invention, the measuring tubes 1 are excited (Step 8, FIGS. 5a & 5b) with the measuring device 2, here, in particular by the actuator assemblies 3, to an oppositely directed torsional oscillation 7 with a frequency $F_1$—by the actuator assemblies 3 being alternately activated with opposing effective directions 9. Thus, for example, the actuator assembly 3 shown at the top of FIG. 1 is activated in such a manner that the first part 3a and the second part 3b move away from each other in opposite effective directions 9a, while, at the same time, in the actuator assembly 3 shown at the bottom in FIG. 1, the first part 3a and the second part 3b move toward each other in opposite effective directions 9b, so that the measuring tubes 1 are excited to torsional oscillation 7 around the measuring tube central axis 4. The actuator assemblies 3 are, consequently, alternately activated so that regular torsional oscillation 7 results around the measuring tube central axis 4 of the measuring tubes 1. The torsional oscillation 7 of the measuring tubes 1 is detected by the measuring device 2, wherein at least the viscosity of the medium is determined by evaluating measured values of the measuring device 2 (Step 10, FIGS. 5a & 5b).

Figure 2:
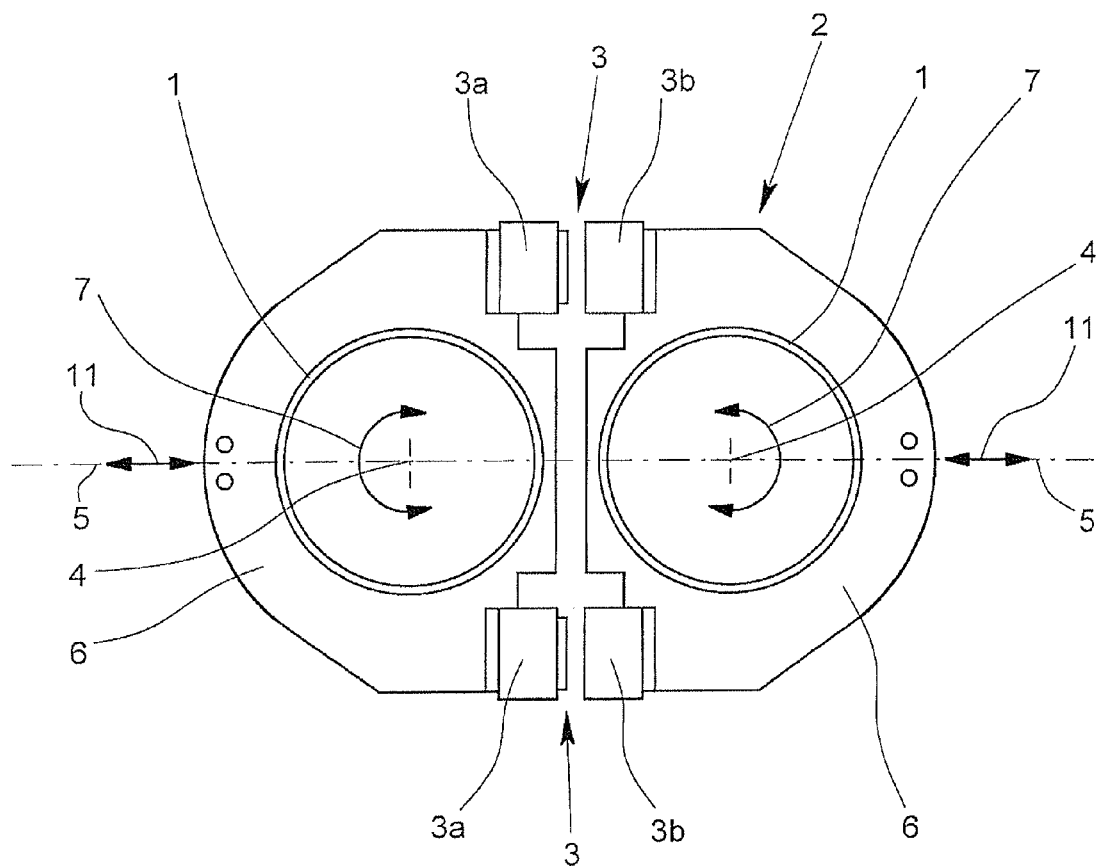
FIG. 2 is a sectional view of two measuring tubes of a Coriolis mass flowmeter, which have been excited to torsional oscillation as well as plane oscillation.

FIG. 2 shows two measuring tubes 1 for a Coriolis mass flowmeter. The actuator assemblies 3 are affixed to the measuring tubes 1 on both sides of the measuring tube plane 5 with holding devices 6. The measuring tubes 1 are excited 8 to torsional oscillation with a frequency $F_1$ by the measuring device 2, and at the same time, excited 12 to plane oscillation 11 with a frequency $F_2$ in the common measuring tube plane 5. Here, at least the mass flow and the viscosity of the medium flowing through the measuring tubes 1 are determined from the measured values detected with the measuring device 2.

Figure 3:
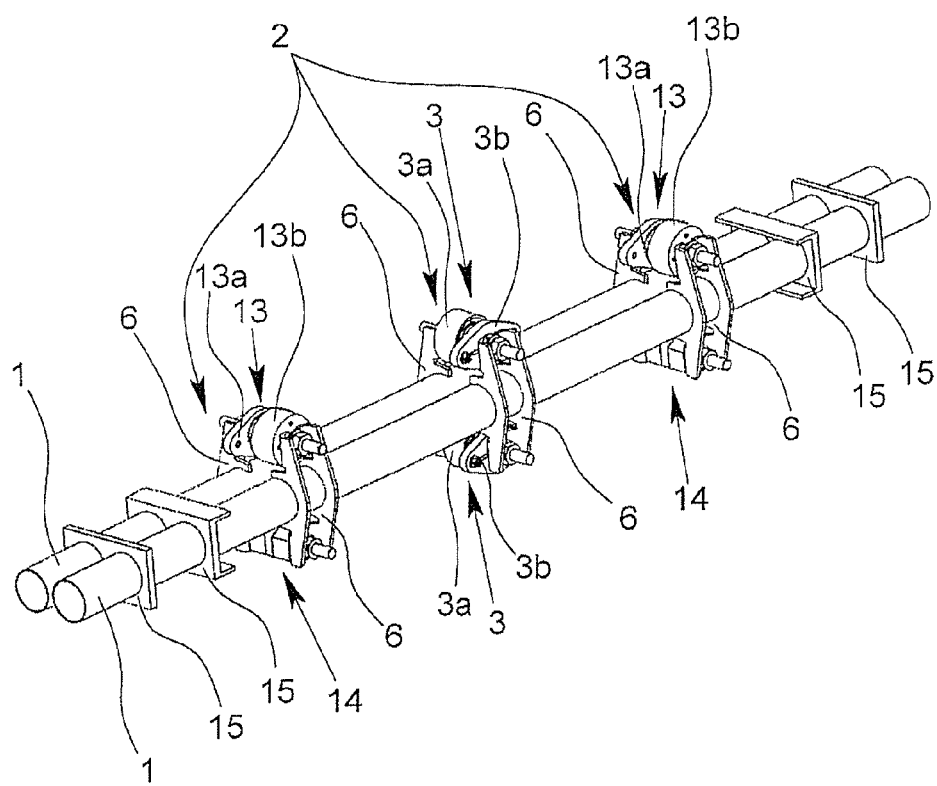
FIG. 3 is a perspective view of an embodiment of a Coriolis mass flowmeter with two actuator assemblies and two sensor assemblies.

FIG. 3 shows two measuring tubes 1 for a Coriolis mass flowmeter. The measuring device 2 includes two actuator assemblies 3 attached to the measuring tubes 1 with a holding device 6 for each part of an actuator assembly 3, wherein one actuator assembly 3 is affixed above the measuring tube plane 5 and one actuator assembly 3 is affixed below the measuring tube plane 5. Either both first parts 3a or both second parts 3b from two actuator assemblies 3 are affixed to one holding device 6. Additionally, in this embodiment, the measuring device 2 includes two sensor assemblies 13, which are formed of a first part 13a of a sensor assembly 13 and a second part 13b of a sensor assembly 13 and are affixed above the measuring tube plane 5 with holding devices 6. In this embodiment, counterweights 14 are affixed on the holding devices 6 on the side of the measuring tube plane 5 opposite the sensor assemblies 13, which balance the weight of the sensor assemblies 13 during the oscillation phases. The measuring tubes 1 are excited with the actuator assemblies 3 to torsional oscillation 7 with a frequency $F_1$ or are additionally excited 12 to plane oscillation 11 in the common measuring tube plane 5 with a frequency $F_2$.

Node plates 15 are arranged on both sides in the end sections of the measuring tubes 1, which define the measuring section of the measuring tubes 1—namely within both inner node plates 15—and prevent a de-coupling of the oscillation onto the piping system surrounding the Coriolis mass flowmeter (not shown).

Figure 4:
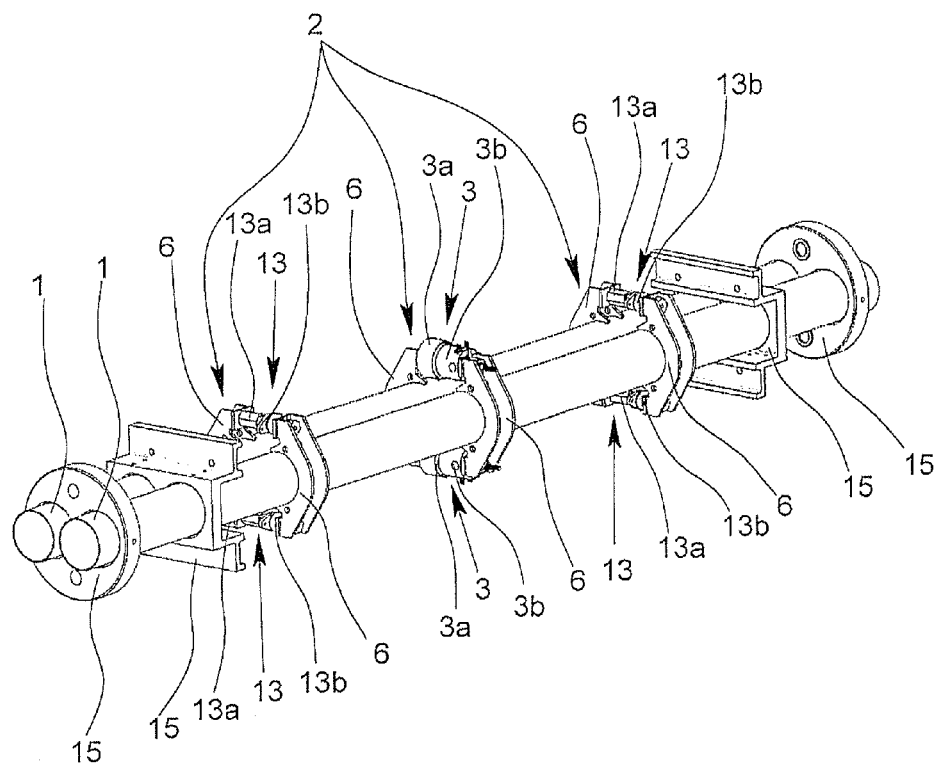
FIG. 4 is a perspective view of an embodiment of a Coriolis mass flowmeter with two actuator assemblies and four sensor assemblies.

FIG. 4 shows an embodiment having two measuring tubes 1 for a Coriolis mass flowmeter with a measuring device 2, and which has two actuator assemblies 3, one each above and below the measuring tube plane 5 and a total of four sensor assemblies 13. The sensor assemblies 13 and the actuator assemblies 3 are each affixed to the measuring tubes 1 with holding devices 6, wherein a first part 13a of a sensor assembly 13 and a first part 3a of an actuator assembly 3 is affixed to one measuring tube 1 and a second part 13b of a sensor assembly 13 and a second part 3b of an actuator assembly 3 is affixed to the other measuring tube 1. The measuring tubes 1 are excited to torsional oscillation 7 with the actuator assemblies 3 at a frequency $F_1$, and at the same time, are excited to plane oscillation 11 with the actuator assembly 3 in the common measuring tube plane 5 at a frequency $F_2$ that differs from frequency $F_1$. The detection of the oscillation—torsional oscillation 7 and plane oscillation 11—of the measuring tubes 1 occurs with the sensor assemblies 13, wherein the sensor assemblies 13 arranged above the measuring tubes 1 in FIG. 4 detect plane oscillation 11 and the sensor assemblies 13 shown below the measuring tubes 1 in FIG. 4 detect torsional oscillation 7. By evaluating the measured value of the measuring device 2, the viscosity and also the mass flow of the flowing medium can be determined. Node plates 15 are located in the end sections of the measuring tubes 1, and prevent a de-coupling of the oscillation to a piping system (not shown).

Figure 5A:
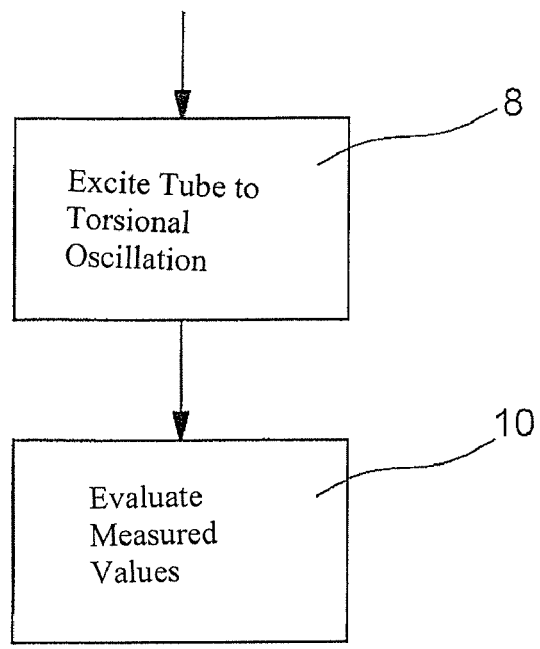
FIGS. 5a & 5b are flow chart views representing two embodiments of the method according to the invention as a flow chart.

FIG. 5a shows a flow chart for an embodiment of a method. The measuring tubes 1 are excited with the measuring device 2 in step 8, in particular with the actuator assemblies 3, at oppositely directed torsional oscillation 7 with a frequency $F_1$, by the actuator assemblies 3 being alternately activated with opposing effective directions 9. The by evaluation with the measured values detected by the measuring device 2, at least the viscosity of the medium is determined in step 10.

Figure 5B:
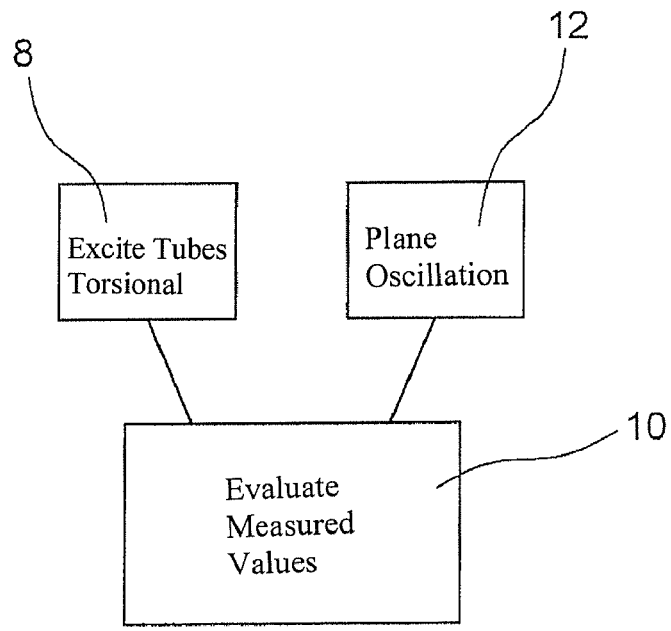

FIG. 5b shows a flow chart for a further embodiment of a method for determining the viscosity of a medium with a Coriolis mass flowmeter, wherein the measuring tubes 1 are excited with the measuring device 2, in particular the actuator assemblies 3 are excited to oppositely directed torsional oscillation 7 with a frequency $F_1$ in step 8, and at the same time, the actuator assemblies 3 are excited (in addition to the torsional oscillation) also to plane oscillation 11 in step 12. By evaluating measured values detected by the measuring device 2, the mass flow and the viscosity of the medium are determined in step 10.

What is claimed is:

1. Method for determining the viscosity of a medium with a Coriolis mass flowmeter having at least two measuring tubes through which a medium can flow and a measuring device having at least two actuator assemblies, the actuator assemblies being arranged on both sides of a measuring tube plane defined by a central axis of the measuring tubes and outside of the measuring tube plane, comprising the steps of:

exciting the measuring tubes with the measuring device to an oppositely directed torsional oscillation with the actuator assemblies being alternately actuated in opposing effective directions and determining at least the viscosity of the medium by evaluation of measured values obtained from the measuring device, said measured values comprising the amplitude of torsional oscillation reached, wherein the amplitude of torsional oscillation reached is evaluated for determining the viscosity of the medium at a set excitation intensity of the measuring device and using the damping coefficient for the medium.

2. Method according to claim 1, wherein both measuring tubes are excited at the same time by the measuring device to excitation at torsional oscillation with a frequency $F_1$, and additionally, at plane oscillation in the common measuring tube plane with a frequency $F_2$ that differs from frequency $F_1$.

3. Method according to claim 2, wherein a difference of at least 2% of the frequency of the torsional oscillation exists between the frequency $F_1$ of the torsional oscillation and the frequency $F_2$ of the plane oscillation.

4. Method according to claim 1, wherein the measuring tubes are excited by the measuring device to torsional oscillation with a frequency $F_1$ and at different times to plane oscillation with a frequency $F_2$ that differs from frequency $F_1$.

5. Method according to claim 4, wherein a difference of at least 2% of the frequency of the torsional oscillation exists between the frequency $F_1$ of the torsional oscillation and the frequency $F_2$ of the plane oscillation.

6. Method according to claim 1, wherein a damping factor of the torsional oscillation of both measuring tubes is determined from the measured values of the measuring device, and wherein the viscosity of the medium is calculated using the damping factor.

7. Method according to claim 1, wherein the measuring device includes at least four sensor assemblies, wherein two sensor assemblies are arranged above and below the measuring tube plane and wherein the torsional oscillation is detected with both sensor assemblies located on one side of the measuring tube plane and the plane oscillation is detected with both sensor assemblies located on the other side of the measuring tube plane.

8. Method according to claim 1, wherein diagnostic information about the maintenance status of the Coriolis mass flowmeter is derived from the measured values of the torsional oscillation.

9. Method according to claim 1, wherein the actuator assemblies are used as a sensor assemblies for determining measured values after exciting the measuring tube to at least one of torsional oscillation and plane oscillation.

10. Method according to claim 1, wherein the measured values are also used to determine the mass flow of a medium flowing in the measuring tubes.

* * * * *